A. E. MOHR.
AUTOMOBILE STARTER.
APPLICATION FILED NOV. 9, 1914.
1,174,432.
Patented Mar. 7, 1916.
2 SHEETS—SHEET 1.
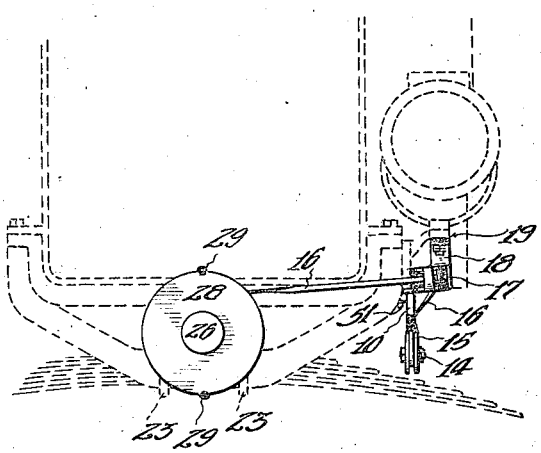
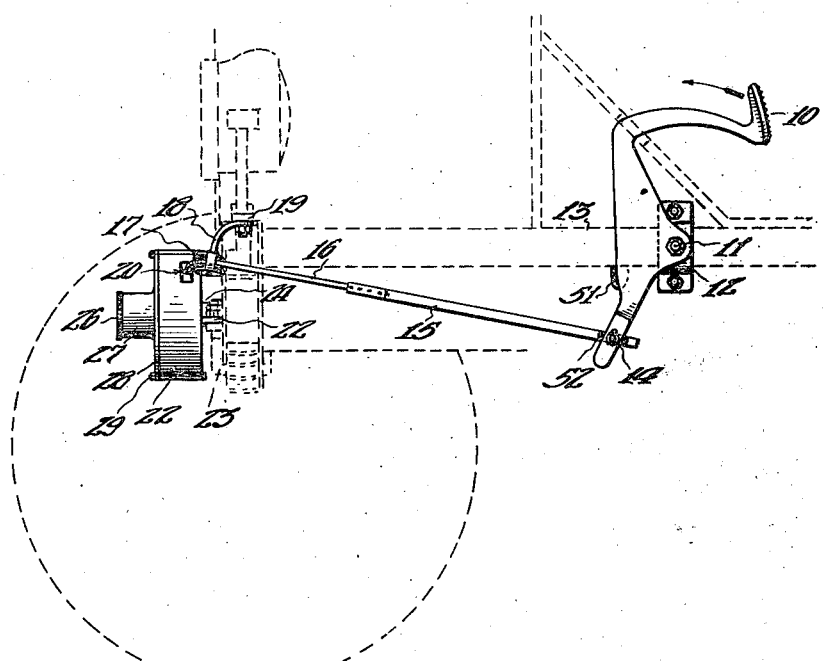

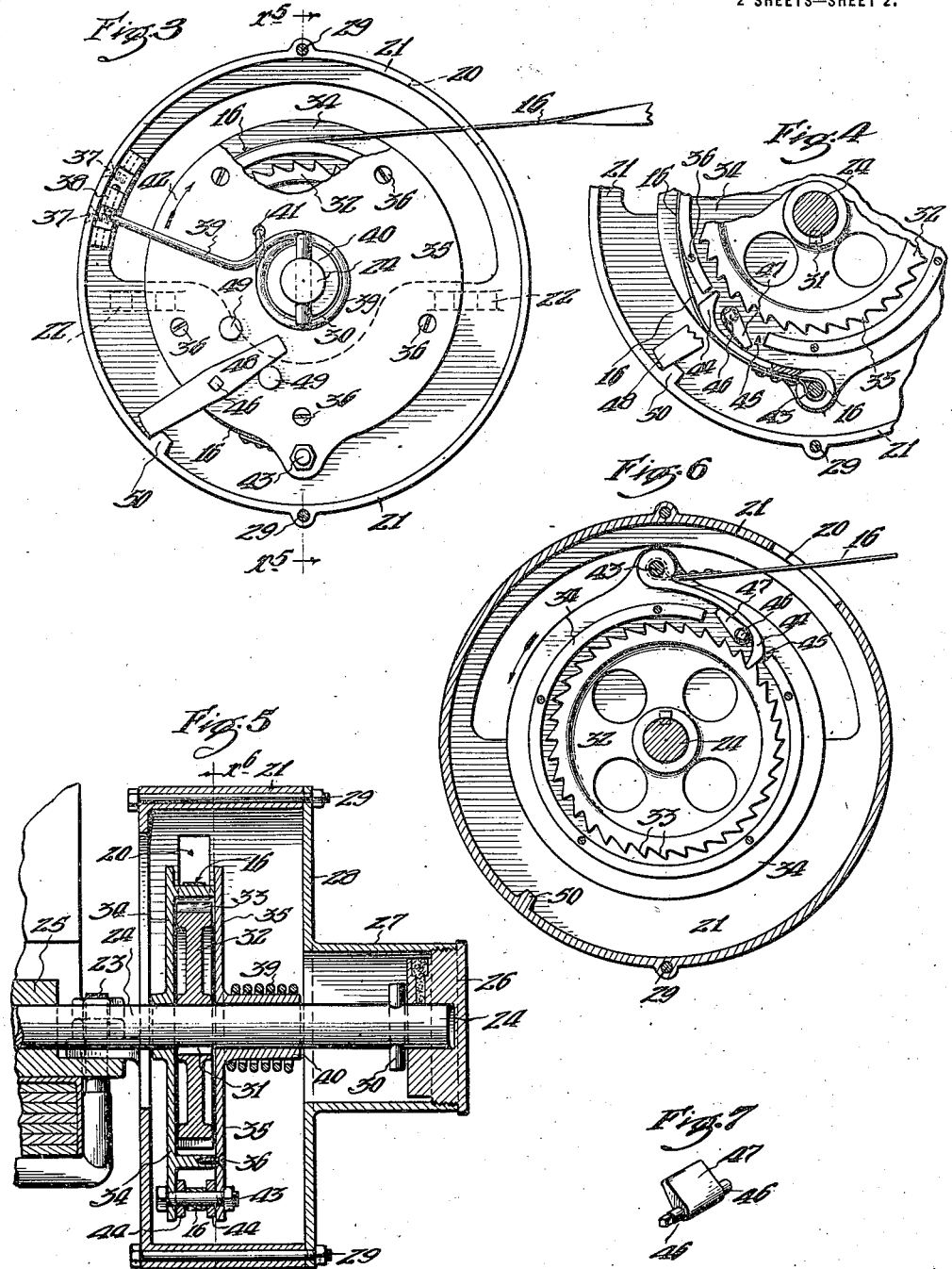

UNITED STATES PATENT OFFICE.

ADAM E. MOHR, OF ALHAMBRA, CALIFORNIA, ASSIGNOR TO BUCKEYE STARTER COMPANY, OF LOS ANGELES, CALIFORNIA, A CORPORATION OF CALIFORNIA.

AUTOMOBILE-STARTER.

1,174,432.  Specification of Letters Patent.  Patented Mar. 7, 1916.

Application filed November 9, 1914.  Serial No. 870,965.

*To all whom it may concern:*

Be it known that I, ADAM E. MOHR, a citizen of the United States, residing at Alhambra, in the county of Los Angeles, State of California, have invented a new and useful Automobile-Starter, of which the following is a specification.

My invention relates to automobiles which are equipped with internal combustion engines and the principal object of the invention is to provide a mechanical starter by which the internal combustion engine can be started from the seat of the automobile by a pedal.

A further object of the invention is to provide in such a starter a new method of engaging and disengaging from the engine shaft.

Further objects and advantages will be made evident hereinafter.

Referring to the drawings which are for illustrative purposes only: Figure 1 is a front view of a portion of an automobile with the invention shown in place. Fig. 2 is a side view of the same. Fig. 3 is a front view of the invention with the cover removed. Fig. 4 is a partial view of the invention with the pulley cover removed. Fig. 5 is a section on the plane $x^5$—$x^5$ of Fig. 3. Fig. 6 is a section on the plane $x^6$—$x^6$ of Fig. 5, with the mechanism at the end of the positive stroke. Fig. 7 is a perspective view of the kick out dog.

In the automobile art it is common practice to drive the automobile by means of an internal combustion engine which must be started by means independent of the engine. The ordinary method of mechanically starting such an engine is to provide a crank projecting from the front of the automobile between the forward wheels which is manually operated when it is desired to start up. This necessitates the driver of the automobile getting out of the machine which is inconvenient and which causes some delay in case the engine stops for any reason. It also necessitates the driver losing control of the machine in case it is started or in case it is necessary to move it quickly to avoid impending dangers.

In my invention I provide a pedal 10 which is pivoted on a pin 11 secured to a bracket 12 which is secured to the frame 13 of an automobile, the pedal 10 having a pin 14 at its lower end to which is attached a pull rod 15. A flexible tape 16 is secured to the end of the pull rod 15 and passes over a pulley 17 carried in a bracket 18 which is secured at 19 to the frame 13 of the automobile. The flexible tape 16 passes through an opening 20 in a housing 21 which is secured by means of lugs 22 and bolts 23 to the forward end of the automobile in such a position that a starting shaft 24 which passes centrally through the housing can be secured to the engine shaft, not shown, of the automobile, the starting shaft 24 passing through a bearing 25 on the automobile. A cap 26 is threaded into an extension 27 formed on a cover 28 which is secured by means of bolts 29 to the housing 21, and the shaft 24 has a pin 30 secured therein and projecting from either side thereof.

When it is desired to start the machine by hand, in the ordinary method, the cap 26 may be removed and a crank inserted in the projection 27 engaging the pins 30 so that the shaft 24 must be rotated in the ordinary manner by this auxiliary crank which is ordinarily removed and carried in the machine, being only utilized in case of accident to the starter proper.

Rigidly secured by means of a key 31 to the shaft 24 is a ratchet wheel 32 which is provided with saw shaped teeth 33 on the periphery thereof. Loosely mounted on the shaft 24 is a pulley 34 having a cover 35 secured thereto by means of screws 36. Rigidly secured inside the housing 21 by means of screws 37 is a spring block 38 in which is secured one end of a spring 39, this spring being coiled around a projection 40 formed on the cover 35 and having its other end secured in a hole 41 in the cover. The spring 39 is so wound that it tends to rotate the pulley 34 in a counter clockwise or negative direction with the parts regarded in the position illustrated in Figs. 3, 4, and 5, this negative direction being shown by an arrow in Fig. 6. Secured between projections on the pulley 34 and the cover 35 is a bolt 43 upon which is pivoted a pawl 44 which extends through an opening 45 formed in the rim of the pulley 34 in such a manner that it may engage the teeth 33 of the ratchet wheel 32. The tape 16 is also secured to the bolt 43 in such a manner that it tends to rotate the pulley 34 in the clockwise direction as shown by the arrow 42 in Fig. 3. A kick out pin 46 is also pivoted in the pulley 34 and the cover 35, and has rigidly secured thereon a kick out dog 47 and a kick out lever 48, the parts 46, 47, and 48 turning freely as a unit in the pulley 34 in the cover 35. A pair of stops 49 are formed on the cover 35 and the lever 48 projects therewith and is stopped thereby. A projection 50 is formed inside the housing 21 in such a manner that the other end of the lever 48 strikes thereon thereby arresting the rotation of the pulley 34 at the end of its negative stroke.

The method of operation of the invention is as follows: The parts being in the position shown in Fig. 3 the spring 39 holds the end of the lever 48 against the stop 50 and pulls upon the tape 16 which is wound up on the pulley 34. A stop 51 is formed on the pedal 10 and small holes 52 are formed on the pull rod 15 so that the pin 14 may be adjusted therein in such a manner that the stop 51 strikes on the frame 13 of the automobile when the parts of the starter proper are in the positon shown in Fig. 3, the pedal 10 being drawn into this position by means of the tape 16 and the pull rod 15. With the parts in the position shown in Figs. 3 and 4, at the beginning of the positive stroke the kick out dog 47 engages the underside of the pawl 44 forcing it into the position shown in Fig. 4 out of engagement with the teeth 33. When the operator wishes to start the machine he presses on the pedal 10 in the direction of the arrow shown in Fig. 2 thereby pulling on the rod 15 and the tape 16. This tends to rotate the pulley 34 in the direction of the arrow 42 to produce the positive stroke of the starter. As the pulley 34 rotates, the end of the lever 48 is drawn away from the projection 50 so that the presure of the kick out dog 47 is relieved from the pawl 44. In the position shown in Fig. 4 at the start of the positive stroke the tape 16 rests upon the top of the pawl 44 and tends to force it downwardly into engagement with the teeth 33. As soon as the pulley 34 has rotated sufficiently to relieve the pressure on the lever 48 thereby relieving the presure of the kick out dog 47 on the underside of the pawl 44, the pawl 44 is forced into engagement with the teeth 33 and the ratchet wheel 32 is positively driven as the pulley 34 is further rotated by a continued movement of the tape 16 caused by a continued pressure on the pedal 10. By means of the sharp kick on the pedal the positive stroke of the pulley 34 is accomplished the engine being rotated in the positive or clockwise direction as indicated by the arrow 42 of Fig. 3. This positive rotation of the engine will ordinarily start it if there is a charge under sufficient compression in the cylinders. If not, it may be necessary to operate the pedal 10 one or more times to obtain the necessary conditions for starting the engine. Immediately upon the occurrence of adequate explosions in the engine cylinders the engine starts to rotate, the shaft 24 continuing to rotate with the engine. The shape of the teeth 33 is such that the pawl 44 slides over them as they rotate. Immediately upon releasing the pressure upon the pedal 10 the spring 39 rotates the pulley 34 in a counter clockwise direction, as indicated by the arrow of Fig. 6, thus causing the negative stroke of the starter. When the pulley 34 has sufficiently rotated to cause the end of the lever 48 to strike against the projections 50 the kick out dog 47 is also rotated lifting the pawl 44 positively so that the ratchet wheel 32 rotates freely inside the pulley 34. It will be seen that whenever the automobile engine is stopped for any reason it can be started by the driver forcing the lever 10 in the direction of the arrow shown in Fig. 2.

I claim as my invention:

1. An engine starter for automobiles comprising a housing secured to the chassis of the automobile, a pulley inside said housing loosely mounted on the starting shaft of said automobile, a ratchet wheel inside said pulley rigidly mounted on said shaft, a spring having one end secured to said pulley and the other end secured to said housing in such a manner that the pulley is rotated in a negative direction, means by which the driver of the automobile rotates said pulley in a positive direction, a pawl pivoted on said pulley adapted to engage said ratchet wheel, a kick out dog so placed as to throw said pawl out of engagement with said ratchet wheel, and means carried by said pulley for actuating said kickout dog whenever the spring has rotated the pulley to the limit of the negative stroke.

2. An engine starter for automobiles comprising a housing secured to the chassis of the automobile, a pulley inside said housing loosely mounted on the starting shaft of said automobile, a ratchet wheel inside said pulley rigidly mounted on said shaft, a spring having one end secured to said pulley and the other end secured to said housing in such a manner that the pulley is rotated in a negative direction, means by which the driver of the automobile rotates said pulley in a positive direction, a pawl pivoted on said pulley adapted to engage said ratchet wheel, a kickout dog so placed as to throw said pawl out of engagement with said ratchet wheel, and a kickout lever rigidly secured to said dog and so placed as to strike on said housing at the end of the negative stroke and throw and hold said pawl out of engagement with said ratchet wheel.

3. A starter for the internal combustion engine used on automobiles comprising a housing surrounding the starting shaft, a pulley inside said housing loosely mounted on said starting shaft, a cover rigidly secured to said pulley having a projection surrounding said shaft, a spring block secured to said housing, a helical spring surrounding the projection on said cover having one end secured to said spring block and the other end secured in said cover in such a manner that it tends to rotate said cover and pulley in a negative direction, means for rotating said pulley in a positive direction, a ratchet wheel inside said pulley, a pawl pivoted on said pulley in such a way as to engage and drive said ratchet wheel in a positive direction, a kickout dog pivoted on said pulley in such a way as to engage said pawl, and means for causing said dog to disengage said pawl from said ratchet wheel at the end of the negative stroke.

4. A starter for the internal combustion engine used on automobiles comprising a housing surrounding the starting shaft, a pulley inside said housing loosely mounted on said starting shaft, a cover rigidly secured to said pulley having a projection surrounding said shaft, a spring block secured to said housing, a helical spring surrounding the projection on said cover having one end secured to said spring block and the other end secured in said cover in such a manner that it tends to rotate said cover and pulley in a negative direction, means for rotating said pulley in a positive direction, a ratchet wheel inside said pulley, a pawl pivoted on said pulley in such a way as to engage and drive said ratchet wheel in a positive direction, a kickout dog pivoted on said pulley in such a way as to engage said pawl, a kickout lever rigidly secured to said kickout dog, and means for causing said kickout dog to release said pawl from said ratchet wheel at the end of the negative stroke.

5. A starter for the internal combustion engine used on automobiles comprising a housing surrounding the starting shaft, a pulley inside said housing loosely mounted on said starting shaft, a cover rigidly secured to said pulley having a projection surrounding said shaft, a spring block secured to said housing, a helical spring surrounding the projection on said cover having one end secured to said spring block and the other end secured in said cover in such a manner that it tends to rotate said cover and pulley in a negative direction, means for rotating said pulley in a positive direction, a ratchet wheel inside said pulley, a pawl pivoted on said pulley in such a way as to engage and drive said ratchet wheel in a positive direction, a kickout dog pivoted on said pulley in such a way as to engage said pawl, a kickout lever rigidly secured to said kickout dog, and a projection on said housing so placed that the kickout lever strikes it at the end of the negative stroke in such a manner as to cause said kickout dog to release said pawl from said ratchet wheel.

6. A starter for the internal combustion engine used on automobiles comprising a housing surrounding the starting shaft, a pulley inside said housing loosely mounted on said starting shaft, a cover rigidly secured to said pulley having a projection surrounding said shaft, a spring block secured to said housing, a helical spring surrounding the projection on said cover having one end secured to said spring block and the other end secured in said cover in such a manner that it tends to rotate said cover and pulley in a negative direction, means for rotating said pulley in a positive direction, a ratchet wheel inside said pulley, a pawl pivoted on said pulley in such a way as to engage and drive said ratchet wheel in a positive direction, a kickout dog pivoted on said pulley in such a way as to engage said pawl, a kickout lever rigidly secured to said kickout dog, a projection on said housing so placed that the kickout lever strikes it at the end of the negative stroke, and stops on said pulley so placed that the movement of said kickout lever is limited to a movement sufficient to cause said kickout dog to release said pawl from said ratchet wheel.

7. In an engine starting device, a ratchet wheel secured to the starting shaft of the engine, a driving pulley loosely mounted on said shaft, a pawl pivoted on said driving wheel, means for simultaneously forcing said pawl into engagement with said ratchet wheel and driving said driving wheel, elastic means for forcing said driving wheel in a negative direction, a kickout dog for throwing said pawl out of engagement with said ratchet wheel, and means for actuating said kickout dog at the end of the negative stroke.

8. In an engine starting device, a ratchet wheel secured to the starting shaft of the engine, a driving pulley loosely mounted on said shaft, a pawl pivoted on said driving wheel, a flexible operating member secured to said driving wheel and resting initially upon said pawl in such a manner as to force it into engagement with the teeth on said ratchet wheel, elastic means for forcing said driving wheel in a negative direction, a kickout dog for throwing said pawl out of engagement with said ratchet wheel, and means for actuating said kickout dog at the end of the negative stroke.

In testimony whereof, I have hereunto set my hand at Los Angeles, California, this 21st day of October, 1914.

ADAM E. MOHR.

In presence of—
 FRED A. MANSFIELD,
 FORD W. HARRIS.